United States Patent
Sakaue et al.

(10) Patent No.: US 7,993,720 B2
(45) Date of Patent: Aug. 9, 2011

(54) INFORMATION RECORDING MEDIUM, METHOD AND APPARATUS FOR MANUFACTURING THE SAME

(75) Inventors: Yoshitaka Sakaue, Osaka (JP); Rie Kojima, Osaka (JP); Takashi Nishihara, Osaka (JP)

(73) Assignee: Panasonic Corporation, Osaka (JP)

( * ) Notice: Subject to any disclaimer, the term of this patent is extended or adjusted under 35 U.S.C. 154(b) by 617 days.

(21) Appl. No.: 12/162,422

(22) PCT Filed: Dec. 18, 2006

(86) PCT No.: PCT/JP2006/325201
§ 371 (c)(1),
(2), (4) Date: Jul. 28, 2008

(87) PCT Pub. No.: WO2007/088682
PCT Pub. Date: Aug. 9, 2007

(65) Prior Publication Data
US 2009/0042046 A1 Feb. 12, 2009

(30) Foreign Application Priority Data
Jan. 31, 2006 (JP) .................................. 2006-022022

(51) Int. Cl.
*B23B 3/02* (2006.01)
(52) U.S. Cl. ..................... 428/64.1; 428/64.4; 428/64.5; 428/64.6; 430/270.13
(58) Field of Classification Search .................. 428/64.4, 428/64.5; 430/270.13
See application file for complete search history.

(56) References Cited

U.S. PATENT DOCUMENTS

| 7,709,073 B2* | 5/2010 | Kojima et al. ............. 428/64.1 |
| 7,829,169 B2* | 11/2010 | Kojima et al. ............. 428/64.4 |
| 2005/0018593 A1 | 1/2005 | Doi et al. |
| 2005/0019695 A1 | 1/2005 | Kojima et al. |
| 2005/0058941 A1* | 3/2005 | Yamada et al. .......... 430/270.11 |
| 2005/0064334 A1 | 3/2005 | Hirotsune et al. |
| 2005/0169159 A1 | 8/2005 | Tamura et al. |
| 2005/0202204 A1 | 9/2005 | Nishihara et al. |

FOREIGN PATENT DOCUMENTS

| JP | 5-94640 A | 4/1993 |
| JP | 2005-56545 A | 3/2005 |
| JP | 2005-63634 A | 3/2005 |
| JP | 2005-119263 A | 5/2005 |
| JP | 2005-205762 A | 8/2005 |
| JP | 2005-254485 A | 9/2005 |
| JP | 2005-293821 A | 10/2005 |
| JP | 2005-302263 A | 10/2005 |

\* cited by examiner

*Primary Examiner* — Elizabeth Mulvaney
(74) *Attorney, Agent, or Firm* — Hamre, Schuman, Mueller & Larson, P.C.

(57) ABSTRACT

An information recording medium of the present invention includes recording layers 19 and 26 whose phase can change by an optical or an electrical system so as to be detectable, and interface layers 18, 20, 25 and 27, which are in contact with the recording layers 19 and 26, to serve as oxide layers. The recording layer 19 contains a Ge—Bi—Te-M material represented by a formula: $Ge_\alpha Bi_\beta Te_\gamma M_{100-\alpha-\beta-\gamma}$ (atom %), where M denotes at least one element selected from Al, Ga, In and Mn, and $\alpha$, $\beta$ and $\gamma$ satisfy $25 \leq \alpha \leq 60$, $0 < \beta \leq 18$, $35 \leq \gamma \leq 55$, and $82 \leq \alpha+\beta+\gamma < 100$. The interface layers 18, 20, 25 and 27 contain at least one oxide of the element M contained in the recording layers 19 and 26.

9 Claims, 3 Drawing Sheets

INFORMATION RECORDING MEDIUM, METHOD AND APPARATUS FOR MANUFACTURING THE SAME

TECHNICAL FIELD

The present invention relates to an information recording medium on and from which information is recorded and reproduced at high speed and high density. The present invention also relates to a method and an apparatus for manufacturing the same.

BACKGROUND ART

The present inventors have developed a 4.7 GB DVD-RAM and a 25 GB, one-sided single-layer (1× speed) Blu-ray Disc as high-capacity, phase-change optical discs that can be used for data files and image files. And from the viewpoint of increasing the recording capacity of the optical discs, the present inventors further have developed a 50 GB (1× speed) Blu-ray Disc having two information layers on one side for the first time. These discs already have been commercialized.

A phase-change recording method, by which these DVD-RAM and Blu-ray discs are recorded, utilizes the fact that a recording layer reversibly changes its state between amorphous and crystalline (or between crystalline and another crystalline with a different structure) by being irradiated with a laser beam. Recording is performed by irradiating an information recording medium with a laser beam to change at least either one of the refractive index and the extinction coefficient of a thin film. In the recorded portion, the amplitude of transmitted light or reflected light changes, and as a result, the amount of the transmitted light or the reflected light changes when reaching a detecting system. The detecting system detects this change to reproduce signals. Generally, it is regarded as an unrecorded state when a recording layer material is in a crystalline state. Signals are recorded by irradiating an information recording medium with a laser beam, melting the recording layer material, and then rapidly cooling the recording layer materials to change it into an amorphous state. In order to erase the signals, the information recording medium is irradiated with a laser beam power lower than that used for recording to change the recording layer into a crystalline state. Phase-change optical discs generally have a dielectric layer, a recording layer and a reflective layer formed on a substrate. Examples of the configuration of such a disc include a configuration in which a first dielectric layer, a recording layer, a second dielectric layer and a reflective layer are stacked sequentially on a substrate.

The following explains the role of each layer. The role of the dielectric layer includes protecting the recording layer from mechanical damage from the outside, emphasizing optical changes using interference effects due to multiple reflections, blocking the influence of outside air to prevent chemical changes, and reducing roughening of the substrate surface and thermal damage of the recording layer in the case where signals are recorded repeatedly. The dielectric layer sometimes is referred to as a protective layer. Moreover, the speed of the crystalline-amorphous state change of the recording layer depends mainly on the composition of the dielectric layer (also referred to as an interface layer), which is in contact with the recording layer. Thus, the dielectric layer has another important role in controlling a crystallization rate. The recording layer absorbs the laser beam as previously described and undergoes the crystalline-amorphous state change, and thereby information is recorded on the recording layer. The role of the reflective layer is to diffuse the heat generated from the recording layer that becomes hot through the laser beam absorption while recording and erasing information.

The present inventors have developed a single-sided dual-layer Blu-ray disc. Single-sided multilayer discs typified by a single-sided dual-layer disc have a plurality of information layers (a first information layer 2, a second information layer 4, a third information layer 6, . . . , an n-th information layer 8 (where n is an integer of 4 or more)) on a substrate 1 as shown in FIG. 2. Each of transparent optical separation layers 3, 5, and 7, which are formed using an ultraviolet curable resin or the like, is interposed between the information layers (between an information layer and another information layer) that are adjacent to each other. Further on top of it (on the n-th information layer 8 in the structure shown in FIG. 2), a cover layer 9 (an optically transparent layer) formed using, for example, the ultraviolet curable resin is provided. In order to record or reproduce information on or from each of the information layers, a laser beam 10 is incident on each of the information layers from the side of the cover layer 9.

Current requirements for information recording media are to have an increased capacity and being available for increased speeds (recording and reproducing information at higher speeds). Developments are proceeding also for Blu-ray disc with an aim of recording and reproducing at a speed within a range of 1× to 2× (9.8 m/s linear velocity) or a range of 1× to 4× (19.7 m/s linear velocity) with respect to the 1× (4.9 m/s linear velocity) recording that already has been commercialized. The present inventors are currently developing a disc to be available for a speed of 1× to 2×.

In phase-change recording, the crystallization rate is adjusted by changing the composition of the recording layer according to a specified linear velocity. When the linear velocity is high, the crystallization rate is increased to make erasure easy. This, however, tends to spoil the stability of recording marks (amorphous phase). When the linear velocity is low, recording becomes easy by decreasing the crystallization rate, but the amorphous phase becomes too stable and thereby a reliability problem arises in that erasure becomes difficult. In order to solve such a problem associated with high speed discs, the present inventors have found Ge—Bi—Te—M (M denotes at least one element selected from Al, Ga, In, and Mn) as a composition for the recording layer.

The higher the linear velocity becomes, the more laser power (recording sensitivity) is required for recording information. Under such a condition, in order to solve the above-mentioned problem and to improve repetitive rewriting performance, an oxide-based material layer containing Hf or a mixture of Zr and Hf, at least one element selected from a group consisting of La, Ce, Al, Ga, In, Mg and Y, and oxygen is disclosed as a dielectric layer (including an interface layer) that has been reported so far (refer to JP2005-56545A, for example).

In this way, the compositions of the materials for the recording layer and the dielectric layer (including the interface layer) are being studied in order to ensure recording and reproducing properties and reliability (repetitive recording) as the speeds become higher.

The following problem arose in increasing the speed of the Blu-ray disc (1× to 2×) that has been under development by the present inventors.

A high temperature humidity test (moisture resistance test), which is one of the lifetime tests, was conducted on a disc. For the recording layer thereof, a Ge—Bi—Te—M material, where M denotes at least one element selected from Al, Ga, In, and Mn, was used. For the layer (the dielectric layer (the interface layer)) that is in contact with the recording layer, a material containing a Zr oxide as its main component was used. A problem however, arose that the recording layer was separated from that layer (the dielectric layer (interface layer)). In order to deal with this problem, various film forming conditions (sputtering power, sputtering gas pressure and additive gas) were examined for the recording layer and the dielectric layer (interface layer), but the separation could not be suppressed.

DISCLOSURE OF INVENTION

The present invention is intended to provide a highly reliable information recording medium in which separation between a recording layer and another layer that is in contact with the recording layer is suppressed. The present invention also is intended to provide a method and an apparatus for manufacturing the information recording medium.

The information recording medium of the present invention includes a recording layer whose phase can change by an optical or an electrical system so as to be detectable, and an oxide layer that is in contact with the recording layer. The recording layer contains a Ge—Bi—Te—M material that is represented by the following formula:

$$Ge_\alpha Bi_\beta Te_\gamma M_{100-\alpha-\beta-\gamma}(atom\ \%),$$

where M denotes at least one element selected from Al, Ga, In and Mn, and $\alpha$, $\beta$ and $\gamma$ satisfy $25\leq\alpha\leq 60$, $0<\beta\leq 18$, $35\leq\gamma\leq 55$, and $82\leq\alpha+\beta+\gamma<100$. The oxide layer contains at least one oxide of the element M contained in the recording layer.

In this description, "atomic %" indicates that the total amount of "Ge" atom, "Bi" atom, "Te" atom and "M" atom is taken as the reference (100%) in the composition formula.

The information recording medium of the present invention is provided with the recording layer containing a Ge—Bi—Te—M material that has been developed in accordance with the increased speeds of the medium, and the oxide layer containing the oxide of the same element as the element M contained in the recording layer. When the oxide layer that is in contact with the recording layer contains an oxide of an element common with the element (element M in the present invention) contained in the recording layer as described above, separation between the recording layer and the oxide layer can be suppressed effectively. Accordingly, a highly reliable information recording medium having excellent moisture resistance can be obtained.

A method for manufacturing the information recording medium of the present invention is a method for manufacturing an information recording medium including a recording layer whose phase can change by an optical or an electrical system so as to be detectable, and an oxide layer that is in contact with the recording layer, the method including:

(i) forming the recording layer containing a Ge—Bi—Te—M material represented by the following formula:

$$Ge_\alpha Bi_\beta Te_\gamma M_{100-\alpha-\beta-\gamma}(atom\ \%),$$

where $\alpha$, $\beta$ and $\gamma$ satisfy $25\leq\alpha\leq 60$, $0<\beta\leq 18$, $35\leq\gamma\leq 55$, and $82\leq\alpha+\beta+\gamma<100$, by a sputtering method using a first sputtering target containing Ge, Bi, Te, and element M, where M denotes at least one element selected from Al, Ga, In, and Mn, and (ii) forming the oxide layer containing at least one oxide of the element M contained in the recording layer by a sputtering method using a second sputtering target containing at least either one element selected from the element M and an oxide of the element M.

An apparatus for manufacturing the information recording medium of the present invention is an apparatus to be used for the manufacturing method of the present invention mentioned above. The apparatus is provided with a sputtering device that includes an electrode, the first sputtering target or the second puttering target, and a substrate holder placed facing the first sputtering target or the second sputtering target.

The method and the apparatus for manufacturing the information recording medium of the present invention can provide a highly reliable information recording medium as described above.

BEST MODE FOR CARRYING OUT THE INVENTION

Embodiment 1

Hereinafter, an embodiment of the present invention will be described with reference to the drawings.

Figure 1:
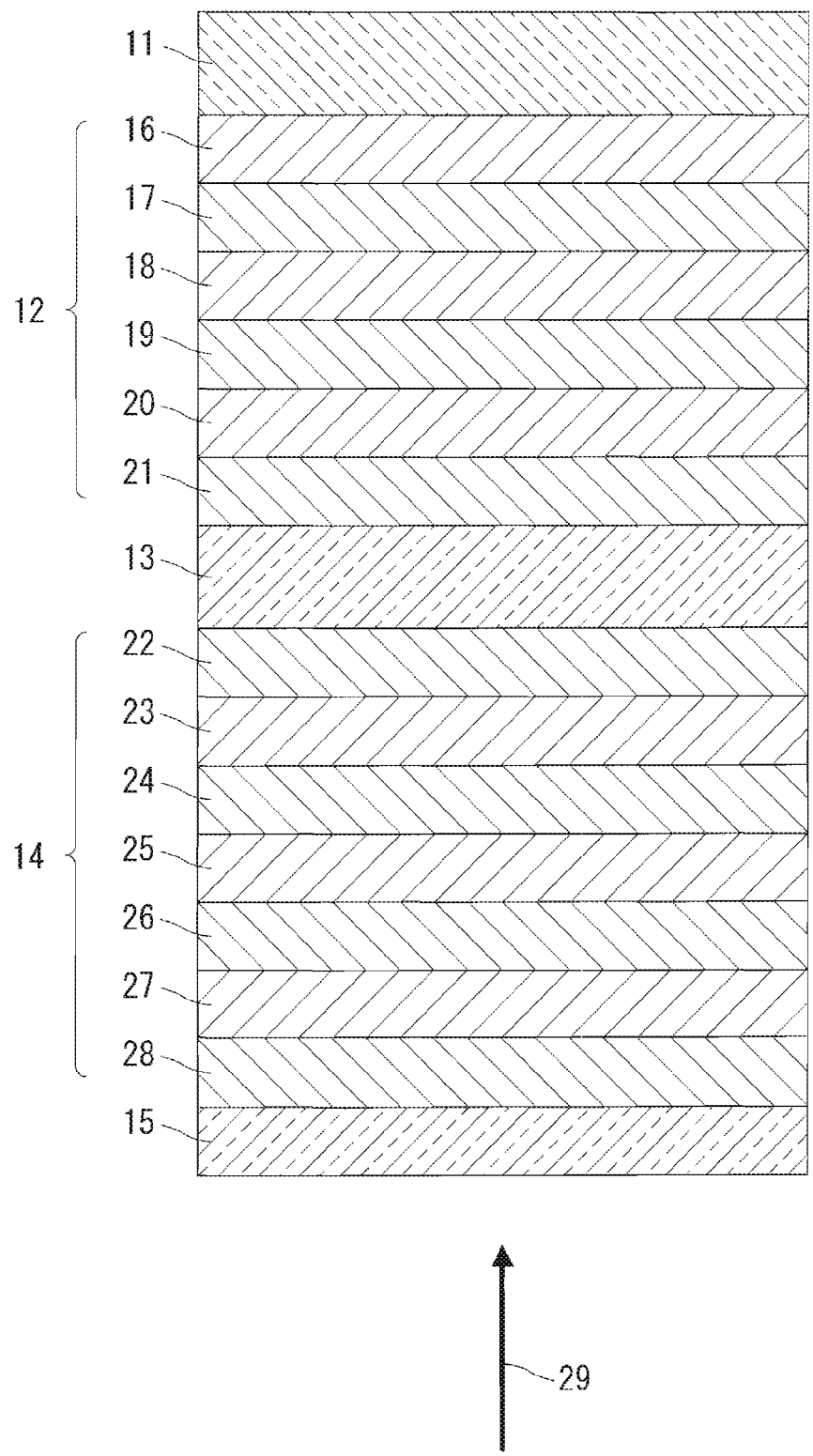
FIG. 1 is a cross-sectional view of an optical disc as an example of the information recording medium of the present invention.

A structure of a disc-like information recording medium used in this embodiment is described using FIG. 1. In FIG. 1, a laser beam 29 to be used for recording and reproducing information is incident from the side of a cover layer 15. A disc-like transparent substrate with a smooth surface is used for a substrate 11. For example, a resin plate made of polycarbonate, PMMA (polymethylmethacrylate) or the like and a glass plate can be used. A continuous groove or the like in the form of a spiral or a concentric circle may be formed on a surface of the substrate.

A first information layer 12 is formed on the substrate 11. The first information layer 12 has at least a reflective layer 16, a dielectric layer 17, a recording layer 19, and a dielectric layer 21.

An optical separation layer 13 is formed on the first information layer 12. The optical separation layer 13 is composed of a material transparent with respect to the wavelength of the laser beam 29 with which the first information layer is irradiated in order to record or reproduce signals on and from the first information layer 12. The optical separation layer 13 serves to optically separate the first information layer 12 and a second information layer 14. The optical separation layer 13 can be produced, for example, by forming a layer made of an ultraviolet curable resin or the like by spin coating, or by bonding a transparent film using an adhesive tape, the ultraviolet curable resin or the like. A continuous groove or the like in the form of a spiral or a concentric circle is formed on a surface of the optical separation layer 13.

The second information layer 14 is formed on the optical separation layer 13. The second information layer 14 has at least a reflective layer 23, a dielectric layer 24, a recording layer 26, and a dielectric layer 28. The cover layer 15 is formed on the second information layer 14. The cover layer 15 can be produced, for example, by forming a layer made of an ultraviolet curable resin or the like by spin coating, or by bonding a transparent film onto the second information layer 14 using the adhesive tape, the ultraviolet curable resin or the like.

Examples of the material to be used for the dielectric layers 17 and 24 include an oxide of Al, Cr, Dy, Ga, Hf, In, Nb, Sn, Y, Zn, Si, Ta, Mo, W, Zr or the like, a sulfide such as ZnS, a nitride of Al, B, Cr, Ge, Si, Ti, Zr, Ta or the like, and a fluoride of Bi, Ce, Dy, Er, Eu La or the like. As a mixture, $ZnS$—$SiO_2$, $ZrO_2$—$SiO_2$, $ZrO_2$—$Cr_2O_3$, $ZrO_2$—$SiO_2$—$Cr_2O_3$, $ZrO_2$—$Ga_2O_3$, $ZrO_2$—$SiO_2$—$Ga_2O_3$, $ZrO_2$—$SiO_2$—$Cr_2O_3$—$LaF_3$, $SnO_2$—$Ga_2O_3$, $SnO_2$—$In_2O_3$, $ZrO_2$—$In_2O_3$, $ZrO_2$—$SiO_2$—$In_2O_3$, $HfO_2$—$Cr_2O_3$, $HfO_2$—$SiO_2$, $HfO_2$—$SiO_2$—$Cr_2O_3$, $SnO_2$—$Nb_2O_3$, $SnO_2$—$Si_3N_4$ or the like may be used. Preferably, the dielectric layer 17 has a thickness of 10 to 40 nm, and more preferably a thickness of 15 to 30 nm from the viewpoint of disc reflectance and recording sensitivity. Preferably, the dielectric layer 24 has a thickness of 5 to 30 nm, and more preferably a thickness of 10 to 22 nm from the viewpoint of disc reflectance and recording sensitivity. As $ZrO_2$, partially stabilized $ZrO_2$ containing 3 mol % of $Y_2O_3$ with respect to $ZrO_2$ ($ZrO_2$:97 mol %, $Y_2O_3$:3 mol %), or stabilized $ZrO_2$ containing 8 mol % of $Y_2O_3$ ($ZrO_2$:92 mol %, $Y_2O_3$:8 mol %) may be used.

Examples of the material to be used for the dielectric layers 21 and 28 include an oxide of Al, Cr, Dy, Ga, Hf, In, Nb, Sn, Y, Zn, Si, Ta, Mo, W, Zr or the like, sulfides such as ZnS, a nitride of Al, B, Cr, Ge, Si, Ti, Zr, Ta or the like, and a fluoride of Bi, Ce, Dy, Er, Eu, La or the like. As a mixture, $ZnS$—$SiO_2$, $ZrO_2$—$SiO_2$, $ZrO_2$—$Cr_2O_3$, $ZrO_2$—$SiO_2$—$Cr_2O_3$, $ZrO_2$—$Ga_2O_3$, $ZrO_2$—$SiO_2$—$Ga_2O_3$, $ZrO_2$—$SiO_2$—$Cr_2O_3$—$LaF$, $SnO_2$—$Ga_2O_3$, $SnO_2$—$In_2O_3$, $ZrO_2$—$In_2O_3$, $ZrO_2$—$SiO_2$—$In_2O_3$, $HfO_2$—$Cr_2O_3$, $HfO_2$—$SiO_2$, $HfO_2$—$SiO_2$—$Cr_2O_3$, $SnO_2$—$Nb_2O_3$, $SnO_2$—$Si_3N_4$ or the like may be used. Preferably, the dielectric layer 21 has a thickness of 40 to 80 nm, and more preferably a thickness of 55 to 75 nm from the viewpoint of disc reflectance and recording sensitivity. Preferably, the dielectric layer 28 has a thickness of 25 to 50 nm, and more preferably a thickness of 30 to 45 nm from the viewpoint of disc reflectance and recording sensitivity. As $ZrO_2$, partially stabilized $ZrO_2$ containing 3 mol % of $Y_2O_3$ with respect to $ZrO_2$, or stabilized $ZrO_2$ containing 8 mol % of $Y_2O_3$ may be used.

In this embodiment, the first information layer 12 is provided with an interface layer 20 between the dielectric layer 21 and the recording layer 19, and an interface layer 18 between the recording layer 19 and the dielectric layer 17. The second information layer 14 is provided with an interface layer 27 between the dielectric layer 28 and the recording layer 26, and an interface layer 25 between the recording layer 26 and the dielectric layer 24. These interface layers (oxide layers) provided in contact with the recording layers contain at least one oxide of an element M contained in the recording layers. The element M denotes at least one element selected from Al, Ga, In, and Mn, and this is the same with each element M to be described hereinafter. When the interface layers are formed using such materials, separation between the recording layer and the interface layer can be suppressed, and thereby a highly reliable information recording medium can be obtained. The content of the oxide of the element M in the interface layers is preferably more than 10 mol % (for example, 12 mol % or higher, or 15 mol % or higher), and more preferably 20 mol % or higher. Also, the content of the oxide of the element M in the interface layers is preferably 90 mol % or lower, and more preferably 80 mol % or lower. The interface layers may be formed only of the oxide of the element M, and also may be formed of a mixture of the oxide of the element M and an oxide of another element. As the oxide of another element, at least one oxide selected from Zr oxide, Si oxide, Cr oxide, Hf oxide, and Y oxide suitably is used, for example. When a plurality of element M is contained in the recording layers, the interface layers in contact with the recording layers contain at least an oxide of one of the plurality of element M contained in the recording layers. As a mixture, $ZrO_2$—$In_2O_3$, $ZrO_2$—$Mn_3O_4$, $ZrO_2$—$Al_2O_3$, $ZrO_2$—$Ga_2O_3$, $ZrO_2$—$SiO_2$—$Ga_2O_3$, $ZrO_2$—$SiO_2$—$Mn_3O_4$, $ZrO_2$—$SiO_2$—$Al_2O_3$, $ZrO_2$—$SiO_2$—$In_2O_3$, $ZrO_2$—$SiO_2$—$Cr_2O_3$—$In_2O_3$, $ZrO_2$—$SiO_2$—$Cr_2O_3$—$Al_2O_3$, $ZrO_2$—$SiO_2$—$Cr_2O_3$—$Mn_3O_4$, $ZrO_2$—$SiO_2$—$Cr_2O_3$—$Ga_2O_3$, $ZrO_2$—$Y_2O_3$—$In_2O_3$, $ZrO_2$—$Y_2O_3$—$Al_2O_3$, $ZrO_2$—$Y_2O_3$—$Mn_3O_4$, $ZrO_2$—$Y_2O_3$—$Ga_2O_3$, $ZrO_2$—$SiO_2$—$HfO_2$—$In_2O_3$, $ZrO_2$—$SiO_2$—$HfO_2$—$Al_2O_3$, $ZrO_2$—$SiO_2$—$HfO_2$—$Ga_2O_3$, $ZrO_2$—$SiO_2$—$HfO_2$—$Mn_3O_4$, $ZrO_2$—$Y_2O_3$—$SiO_2$—$Ga_2O_3$, $ZrO_2$—$Y_2O_3$—$SiO_2$—$Mn_3O_4$, $ZrO_2$—$Y_2O_3$—$SiO_2$—$Al_2O_3$, $ZrO_2$—$Y_2O_3$—$SiO_2$—$In_2O_3$, $ZrO_2$—$Y_2O_3$—$In_2O_3$—$Cr_2O_3$, $ZrO_2$—$Y_2O_3$—$Al_2O_3$—$Cr_2O_3$, $ZrO_2$—$Y_2O_3$—$Mn_3O_4$—$Cr_2O_3$, and $ZrO_2$—$Y_2O_3$—$Ga_2O_3$—$Cr_2O_3$ may be used, for example. Preferably, the interface layers 18, 20, 25, and 27 have a thickness of 1 to 10 nm, and further preferably have a thickness of 3 to 7 nm. As $ZrO_2$, partially stabilized $ZrO_2$ containing 3 mol % of $Y_2O_3$ with respect to $ZrO_2$, or stabilized $ZrO_2$ containing 8 mol % of $Y_2O_3$ may be used.

Although the interface layer is provided on both sides of each of the recording layers in this embodiment, it is not limited to this configuration. In the first information layer 12, for example, the interface layer may be provided either between the dielectric layer 21 and the recording layer 19 or between the recording layer 19 and the dielectric layer 17. This is also the case with the second information layer 14.

The recording layers 19 and 26 of the present invention are formed using a material containing a phase change material (a Ge—Bi—Te—M material) that contains, as its main component, Te, Ge, Bi, and element M. Since the element M is as described above, examples of the material to be used for the recording layers 19 and 26 include Ge—Te—Bi—In, Ge—Te—Bi—Al, Ge—Te—Bi—Ga, Ge—Te—Bi—Mn, Ge—Te—Bi—In—Sn, Ge—Te—Bi—Al—Sn, Ge—Te—Bi—Ga—Sn, Ge—Te—Bi—Mn—Sn, Ge—Te—Bi—In—Ag, Ge—Te—Bi—Al—Ag, Ge—Te—Bi—Ga—Ag, Ge—Te—Bi—Mn—Ag, Ge—Te—Bi—In—Au, Ge—Te—Bi—Al—Au, Ge—Te—Bi—Ga—Au, and Ge—Te—Bi—Mn—Au. Specifically, a material whose composition is represented by $Ge_\alpha Bi_\beta Te_\gamma M_{100-\alpha-\beta-\gamma}$ (atom %), where $25 \leq \alpha \leq 60$, $0 \leq \beta \leq 18$, $35 \leq \gamma \leq 55$, and $82 \leq \alpha+\beta+\gamma \leq 100$ is used. The same numerical value ranges are applied to $\alpha$, $\beta$, and $\gamma$ to be described below. Preferably, the recording layer 19 has a thickness of 8 to 18 nm from the viewpoint of reflectance. Preferably, the recording layer 26 has a thickness of 5 to 12 nm from the viewpoint of transmittance.

A material containing, as its main component, metallic elements, such as Ag, Au, and Al, can be used for the reflective layers 16 and 23. An Ag alloy or an Al alloy obtained by adding elements, such as Mg, Ca, Cr, Nd, Pd, Cu, Ni, Co, Pt, Ga, Dy, In, Nb, V, Ti, La, Bi, Ce, Pr, Sm, Gd, Th, Y, Zn, Mo, W, Ta, Nb, Fe to Ag or Al may be used. Preferably, the reflective layer 16 has a thickness of 50 to 160 nm, and further preferably has a thickness of 60 to 100 nm from the viewpoint of reflectance. Preferably, the reflective layer 23 has a thickness of 6 to 15 nm, and further preferably has a thickness of 7 to 12 nm from the viewpoint of transmittance.

For a high refractive index layer 22, a material containing, as its main component, an oxide of Ti or Nb, a nitride of Ti or Nb, or a mixture of these. These materials are characterized in that they have a refractive index higher than that of the dielectric layers 17, 21, 24, and 28 and the interface layers 18, 20, 25, and 27 at a laser beam wavelength of 400 nm, at which information is recorded and reproduced. Thereby, a higher transmission can be realized. For example, $TiO_2$ has a refractive index of 2.7 at a wavelength of 400 nm while ZnS-20 mol % $SiO_2$ to be used for the dielectric layers has a refractive index of 2.3, and $ZrO_2$-50 mol % $In_2O_3$ to be used for the interface layers has a refractive index of 2.2. Preferably, the high refractive index layer 22 has a thickness of 10 to 30 nm, and further preferably has a thickness of 15 to 25 nm from the viewpoint of transmittance. "ZnS-20 mol % $SiO_2$" indicates a mixture of 80 mol % of ZnS and 20 mol % of $SiO_2$. "$ZrO_2$-50 mol % $In_2O_3$" indicates a mixture of 50 mol % of $ZrO_2$ and 50 mol % of $In_2O_3$. That is, in this specification, a mixture of compound A of (100-X) mol % and compound B of X mol % is referred to as "A-X mol % B" or "$(A)_{(100-X)}(B)_X$" in some cases.

As a method for forming the dielectric layers, the recording layers, the reflective layers, the interface layers, and the high refractive index layer, an electron beam vapor deposition method, a sputtering method, a CVD method, a laser sputtering method or the like usually are adopted. The most suitable method, such as DC sputtering and RF sputtering, will be used according to the sputtering material. Generally, the dielectric layers and the interface layers are formed by RF sputtering, the recording layers and the reflective layers are formed by DC sputtering, and the high refractive index layer, which the present inventors have adopted, is formed by DC sputtering. This, however, also depends on the material of the target. There may arise a difference between the composition of the film formed by sputtering and the composition of the sputtering target due to the sputtering device or the sputtering conditions to be used. However, with the sputtering device and the sputtering conditions that the present inventors have been studying, the composition difference hardly occurs. Thus, it is possible to use a sputtering target having the same composition as that of the film to be formed in order to obtain a film of desired composition. Accordingly, in order to form the recording layers 19 and 26 by sputtering, a sputtering target (a first sputtering target) having a composition represented by $Ge_\alpha Bi_\beta Te_\gamma M_{100-\alpha-\beta-\gamma}$ (atom %), which is the composition of the film to be formed, can be used. Specifically, the recording layers 19 and 26 can be formed using a sputtering target that has a composition such as $Ge_{44}Bi_4Te_{51}Ga_1$ (atom %), $Ge_{44}Bi_4Te_{51}Mn_1$ (atom %), $Ge_{44}Bi_4Te_{51}In_1$ (atom %), and $Ge_{44}Bi_4Te_{51}Al_1$ (atom %), for example. In order to form the interface layers 18, 20, 25, and 27 by sputtering, it is possible, for example, to use a sputtering target (a second sputtering target) having a composition obtained by mixing an oxide of the element M contained in the recording layers 19 and 26 and at least one oxide selected from Zr oxide, Si oxide, Cr oxide, Hf oxide, and Y oxide. Specifically, a sputtering target having a composition such as $ZrO_2$-50 mol % $In_2O_3$, $ZrO_2$-50 mol % $Al_2O_3$, $ZrO_2$-50 mol % $Mn_3O_4$ and $ZrO_2$-50 mol % $Ga_2O_3$ can be used, for example. As a sputtering gas necessary for sputtering, an inert gas typified by Ar may be used. Furthermore, oxygen, nitrogen or the like may be used as an additive gas.

Figure 3:
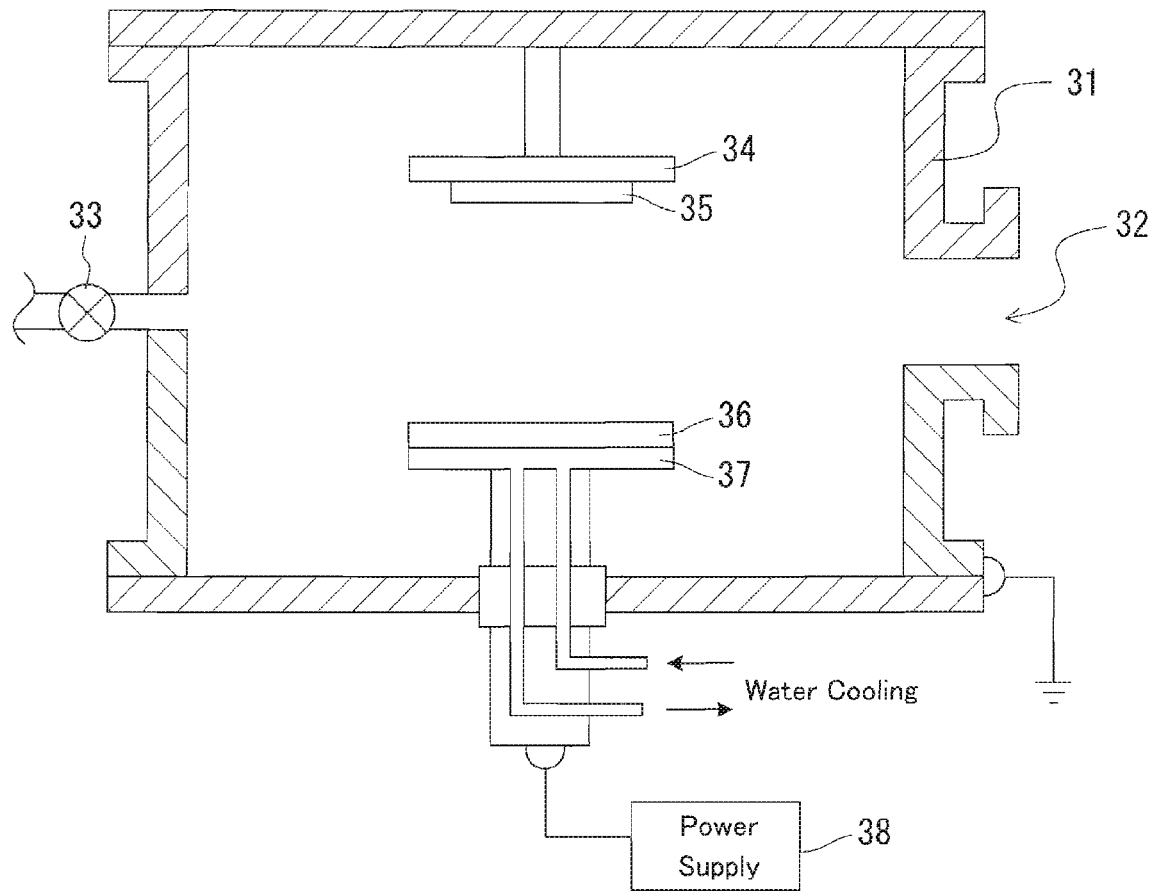
FIG. 3 is a schematic view illustrating an example of a sputtering device to be used for the apparatus for manufacturing the information recording medium of the present invention.

As an apparatus for manufacturing the information recording medium of the present invention, it is possible, for example, to use a manufacturing apparatus provided with a sputtering device that includes an electrode, the first sputtering target or the second sputtering target, and a substrate holder placed facing one of these sputtering targets. The use of such an apparatus makes it possible to form the recording layers and the interface layers constituting the information recording medium of the present invention on a substrate disposed on the substrate holder. FIG. 3 illustrates one example of the sputtering device. The sputtering device to be used for forming the information recording medium of the present invention is not limited to this. As shown in FIG. 3, this sputtering device is designed so that a vacuum pump (not shown) can be connected to a vacuum chamber 31 via an air exit port 32 in order to maintain the interior of the vacuum chamber 31 under a high vacuum. A constant flow of gas can be supplied from a gas supply port 33. A substrate 35 (the substrate referred to herein means a substrate on which films to be stacked) is mounted on an anode (electrode, substrate holder) 34. By grounding the vacuum chamber 31, the vacuum chamber 31 and the substrate 35 are maintained anodic. A sputtering target 36 is connected to a cathode (electrode) 37 and is connected to a power supply via a switch (not shown). Application of a predetermined voltage between the anode 34 and the cathode 37 causes ejection of particles from the sputtering target 36, and the particles form a thin film on the substrate 35.

Figure 2:
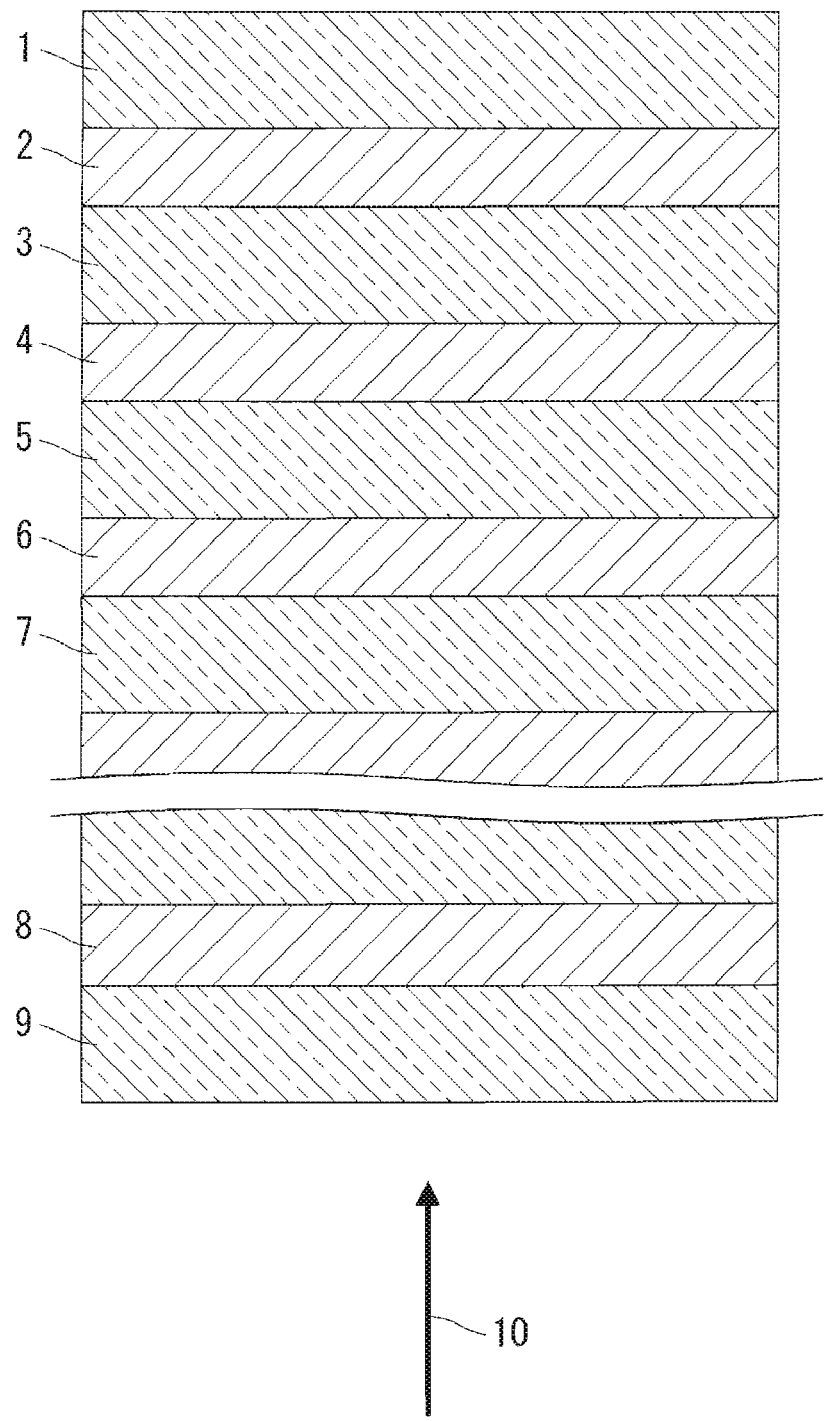
FIG. 2 is a cross-sectional view of an optical disc as another example of the information recording medium of the present invention.

This embodiment describes an information recording medium in which the two information layers 12 and 14 are stacked with the optical separation layer 13 interposed therebetween. However, even in the case where only one information layer is provided (in the case where only the substrate 1, the first information layer 2 and the cover layer 9 are provided, or only the substrate 1, the second information layer 4, and the cover layer 9 are provided in FIG. 1), the same effect can be obtained by using the same materials as those described in this embodiment for the recording layer and the interface layers. Furthermore, in the case of an information recording medium provided with three or more information layers as shown in FIG. 2, the same effect also can be obtained by using the same materials as those described in this embodiment for the recording layer and the interface layer in at least one of the information layers.

EXAMPLES

Hereinafter, the present invention is described in further detail using examples.

Comparative Example 1

A structure of a disc-like information recording medium of comparative example 1 is described in detail with reference to FIG. 1 and Table 1. A polycarbonate substrate with a diameter of 120 mm and a thickness of 1.1 mm having on its surface a concave-convex guide groove with a pitch of 0.3 μm and a depth of 20 nm was used as the substrate 11. A 100-nm-thick Ag alloy film to serve as the reflective layer 16, a 25-nm-thick $ZrO_2$-20 mol % $Cr_2O_3$ film to serve as the dielectric layer 17, a 12-nm-thick $Ge_{44}Bi_4Te_{51}Ga_1$ film to serve as the recording layer 19, a 5-nm-thick $ZrO_2$-20 mol % $Cr_2O_3$ film to serve as the interface layer 20, and a 65-nm-thick ZnS-20 mol % $SiO_2$ film to serve as the dielectric layer 21 were formed respectively on the substrate by a magnetron sputtering method to form the first information layer 12. In this case, the interface layer 18 shown in FIG. 1 is omitted. Then, an ultraviolet curable resin was applied on the first information layer 12, and a polycarbonate substrate with a radius of 120 mm and a thickness of 0.6 mm having on its surface a concave-convex guide groove with a pitch of 0.3 μm and a depth of 20 nm was allowed to adhere thereto. The ultraviolet curable resin was cured by ultraviolet ray irradiation, and the polycarbonate substrate was stripped off. Thus the optical separation layer 13 of 25 μm thickness with a groove transferred to its surface was formed. Subsequently, a 24-nm-thick $TiO_2$ film to serve as the high refractive index layer 22, an 10-nm-thick Ag alloy film to serve as the reflective layer 23, which has the same material composition as that of the reflective layer 16 of the first information layer, a 18-nm-thick $ZrO_2$-20 mol % $Cr_2O_3$ film to serve as the dielectric layer 24, a 7-nm-thick $Ge_{44}Bi_4Te_{51}Ga_1$ film to serve as the recording layer 26, a 5-nm-thick $ZrO_2$-20 mol % $Cr_2O_3$ film to serve as the interface layer 27, a 35-nm-thick ZnS-20 mol % $SiO_2$ film to serve as the dielectric layer 28 were formed respectively on the optical separation layer 13 by the magnetron sputtering method to form the second information layer 14. Then, the cover layer 15 with a thickness of 0.1 mm was formed by a spin coat method. In short, the information recording medium of Comparative Example 1 describes the case where any oxides of the elements contained in the recording layers are not contained in the interface layers corresponding to the oxide layers of the present invention.

TABLE 1

| Material composition of the first information layer 12 | |
|---|---|
| Reflective layer 16 | Ag alloy |
| Dielectric layer 17 | $ZrO_2$-20 mol % $Cr_2O_3$ |
| Interface layer 18 | Not provided |
| Recording layer 19 | $Ge_{44}Bi_4Te_{51}Ga_1$ |
| Interface layer 20 | $ZrO_2$-20 mol % $Cr_2O_3$ |
| Dielectric layer 21 | ZnS-20 mol % $SiO_2$ |
| Material composition of the second information layer 14 | |
| High refractive index layer 22 | $TiO_2$ |
| Reflective layer 23 | Ag alloy |
| Dielectric layer 24 | $ZrO_2$-20 mol % $Cr_2O_3$ |
| Interface layer 25 | Not provided |
| Recording layer 26 | $Ge_{44}Bi_4Te_{51}Ga_1$ |
| Interface layer 27 | $ZrO_2$-20 mol % $Cr_2O_3$ |
| Dielectric layer 28 | ZnS-20 mol % $SiO_2$ |

Comparative Example 2

A structure of a disc-like information recording medium of comparative example 2 is described in detail with reference to FIG. 1 and Table 2. A polycarbonate substrate with a diameter of 120 mm and a thickness of 1.1 mm having on its surface a concave-convex guide groove with a pitch of 0.3 μm and a depth of 20 nm was used as the substrate 11. A 80-nm-thick Ag alloy film to serve as the reflective layer 16, a 20-nm-thick $ZrO_2$-20 mol % $Cr_2O_3$ film to serve as the dielectric layer 17, a 5-nm-thick $ZrO_2$-25 mol % $SiO_2$-50 mol % $Ga_2O_3$ film to serve as the interface layer 18, a 12-nm-thick $Ge_{44}Bi_4Te_{51}Al_1$ film to serve as the recording layer 19, a 5-nm-thick $ZrO_2$-25 mol % $SiO_2$-50 mol % $Ga_2O_3$ film to serve as the interface layer 20, and a 65-nm-thick ZnS-20 mol % $SiO_2$ film to serve as the dielectric layer 21 were formed respectively on the substrate by the magnetron sputtering method to form the first information layer 12. Then, an ultraviolet curable resin was applied on the first information layer 12, and a polycarbonate substrate with a radius of 120 mm and a thickness of 0.6 mm having on its surface a concave-convex guide groove with a pitch of 0.3 μm and a depth of 20 nm was allowed to adhere thereto. The ultraviolet curable resin was cured by ultraviolet ray irradiation, and the polycarbonate substrate was stripped off. Thus the optical separation layer 13 of 25 μm thickness with a groove transferred to its surface was formed. Subsequently, a 23-nm-thick $TiO_2$ film to serve as the high refractive index layer 22, a 10-nm-thick Ag alloy film to serve as the reflective layer 23, which has the same material composition as that of the reflective layer 24 of the first information layer 12, a 13-nm-thick $ZrO_2$-20 mol % $Cr_2O_3$ film to serve as the dielectric layer 24, a 5-nm-thick $ZrO_2$-25 mol % $SiO_2$-50 mol % $Ga_2O_3$ film to serve as the interface layer 25, a 7-nm-thick $Ge_{44}Bi_4Te_{51}Al_1$ film to serve as the recording layer 26, a 5-nm-thick $ZrO_2$-25 mol % $SiO_2$-50 mol % $Ga_2O_3$ film to serve as the interface layer 27, and a 35-nm-thick ZnS-20 mol % $SiO_2$ film to serve as the dielectric layer 28 were formed respectively on the optical separation layer 13 by the magnetron sputtering method to form the second information layer 14. Then, the cover layer 15 with a thickness of 0.1 mm was formed by the spin coat method. In short, the information recording medium of Comparative Example 2 describes the case where no oxides of the elements contained in the recording layers are contained in the interface layers corresponding to the oxide layers of the present invention.

TABLE 2

| Material composition of the first information layer 12 | |
|---|---|
| Reflective layer 16 | Ag alloy |
| Dielectric layer 17 | $ZrO_2$-20 mol % $Cr_2O_3$ |
| Interface Layer 18 | $ZrO_2$-25 mol % $SiO_2$-50 mol % $Ga_2O_3$ |
| Recording layer 19 | $Ge_{44}Bi_4Te_{51}Al_1$ |
| Interface layer 20 | $ZrO_2$-25 mol % $SiO_2$-50 mol % $Ga_2O_3$ |
| Dielectric layer 21 | ZnS-20 mol % $SiO_2$ |
| Material composition of the second information layer 14 | |
| High refractive index layer 22 | $TiO_2$ |
| Reflective layer 23 | Ag alloy |
| Dielectric layer 24 | $ZrO_2$-20 mol % $Cr_2O_3$ |
| Interface layer 25 | $ZrO_2$-25 mol % $SiO_2$-50 mol % $Ga_2O_3$ |
| Recording layer 26 | $Ge_{44}Bi_4Te_{51}Al_1$ |
| Interface layer 27 | $ZrO_2$-25 mol % $SiO_2$-50 mol % $Ga_2O_3$ |
| Dielectric layer 28 | ZnS-20 mol % $SiO_2$ |

Example 1

A structure of a disc-like information recording medium of Example 1 is described in detail with reference to FIG. 1 and Table 3. A polycarbonate substrate with a diameter of 120 mm and a thickness of 1.1 mm having on its surface a concave-convex guide groove with a pitch of 0.3 μm and a depth of 20 nm was used as the substrate 11. A 80-nm-thick Ag alloy film to serve as the reflective layer 16, a 20-nm-thick $ZrO_2$-20 mol % $Cr_2O_3$ film to serve as the dielectric layer 17, a 5-nm-thick $ZrO_2$-25 mol % $SiO_2$-50 mol % $Ga_2O_3$ film to serve as the interface layer 18, a 12-nm-thick $Ge_{44}Bi_4Te_{51}Ga_1$ film to serve as the recording layer 19, a 5-nm-thick $ZrO_2$-25 mol % $SiO_2$-50 mol % $Ga_2O_3$ film to serve as the interface layer 20, and a 65-nm-thick ZnS-20 mol % $SiO_2$ film to serve as the dielectric layer 21 were formed respectively on the substrate by the magnetron sputtering method to form the first information layer 12. Then, an ultraviolet curable resin was applied on the first information layer 12, and a polycarbonate substrate with a radius of 120 mm and a thickness of 0.6 mm having on its surface a concave-convex guide groove with a pitch of 0.3 μm and a depth of 20 nm was allowed to adhere thereto. The ultraviolet curable resin was cured by ultraviolet ray irradiation, and the polycarbonate substrate was stripped off. Thus the optical separation layer 13 of 25 μm thickness with a groove transferred to its surface was formed. Subsequently, a 23-nm-thick $TiO_2$ film to serve as the high refractive index layer 22, a 10-nm-thick Ag alloy film to serve as the reflective layer 23, which has the same material composition as that of the reflective layer 24 of the first information layer, a 13-nm-thick $ZrO_2$-20 mol % $Cr_2O_3$ film to serve as the dielectric layer 25, a 5-nm-thick $ZrO_2$-25 mol % $SiO_2$-50 mol % $Ga_2O_3$ film to serve as the interface layer 26, a 7-nm-thick $Ge_{44}Bi_4Te_{51}Ga_1$ film to serve as the recording layer 27, a 5-nm-thick $ZrO_2$-25 mol % $SiO_2$-50 mol % $Ga_2O_3$ film to serve as the interface layer 28, and a 35-nm-thick ZnS-20 mol % $SiO_2$ film to serve as the dielectric layer 29 were formed respectively on the optical separation layer 13 by the magnetron sputtering method to form the second information layer 14. Then, the cover layer 15 with a thickness of 0.1 mm was formed by the spin coat method. In short, the information recording medium of Example 1 describes the case where an oxide of at least one of the elements contained in the recording layers is contained in the interface layers (Ga in the recording layers and $Ga_2O_3$ in the interface layers).

TABLE 3

Material composition of the first information layer 12

| | |
|---|---|
| Reflective layer 16 | Ag alloy |
| Dielectric layer 17 | $ZrO_2$-20 mol % $Cr_2O_3$ |
| Interface Layer 18 | $ZrO_2$-25 mol % $SiO_2$-50 mol % $Ga_2O_3$ |
| Recording layer 19 | $Ge_{44}Bi_4Te_{51}Ga_1$ |
| Interface layer 20 | $ZrO_2$-25 mol % $SiO_2$-50 mol % $Ga_2O_3$ |
| Dielectric layer 21 | ZnS-20 mol % $SiO_2$ |

Material composition of the second information layer 14

| | |
|---|---|
| High refractive index layer 22 | $TiO_2$ |
| Reflective layer 23 | Ag alloy |
| Dielectric layer 24 | $ZrO_2$-20 mol % $Cr_2O_3$ |
| Interface layer 25 | $ZrO_2$-25 mol % $SiO_2$-50 mol % $Ga_2O_3$ |
| Recording layer 26 | $Ge_{44}Bi_4Te_{51}Ga_1$ |
| Interface layer 27 | $ZrO_2$-25 mol % $SiO_2$-50 mol % $Ga_2O_3$ |
| Dielectric layer 28 | ZnS-20 mol % $SiO_2$ |

Example 2

A structure of a disc-like information recording medium of Example 2 is described in detail with reference to FIG. 1 and Table 4. A polycarbonate substrate with a diameter of 120 mm and a thickness of 1.1 mm having on its surface a concave-convex guide groove with a pitch of 0.3 μm and a depth of 20 nm was used as the substrate 11. A 80-nm-thick Ag alloy film to serve as the reflective layer 16, a 20-nm-thick $ZrO_2$-20 mol % $Cr_2O_3$ film to serve as the dielectric layer 17, a 5-nm-thick $ZrO_2$-20 mol % $Ga_2O_3$ film (X varies in a range of $0 \leq X \leq 90$) to serve as the interface layer 18, a 12-nm-thick $Ge_{44}Bi_4Te_{51}Ga_1$ film to serve as the recording layer 19, a 5-nm-thick $ZrO_2$—X mol % $Ga_2O_3$ film (X varies in a range of $0 \leq X \leq 90$) to serve as the interface layer 20, and a 65-nm-thick ZnS-20 mol % $SiO_2$ film to serve as the dielectric layer 21 were formed respectively on the substrate by the magnetron sputtering method to form the first information layer 12. Then, an ultraviolet curable resin was applied on the first information layer 12, and a polycarbonate substrate with a radius of 120 mm and a thickness of 0.6 mm having on its surface a concave-convex guide groove with a pitch of 0.3 μm and a depth of 20 nm was allowed to adhere thereto. The ultraviolet curable resin was cured by ultraviolet ray irradiation, and the polycarbonate substrate was stripped off. Thus the optical separation layer 13 of 25 μm thickness with a groove transferred to its surface was formed. Subsequently, a 23-nm-thick $TiO_2$ film to serve as the high refractive index layer 22, a 10-nm-thick Ag alloy film to serve as the reflective layer 23, which has the same material composition as that of the reflective layer 16 of the first information layer 12, a 13-nm-thick $ZrO_2$-20 mol % $Cr_2O_3$ film to serve as the dielectric layer 24, a 5-nm-thick $ZrO_2$—X mol % $Ga_2O_3$ film (X varies in a range of $0 \leq X \leq 90$) to serve as the interface layer 25, a 7-nm-thick $Ge_{44}Bi_4Te_{51}Ga_1$ film to serve as the recording layer 26, a 5-nm-thick $ZrO_2$—X mol % $Ga_2O_3$ film (X varies in a range of $0 \leq X \leq 90$) to serve as the interface layer 27, and a 35-nm-thick ZnS-20 mol % $SiO_2$ film to serve as the dielectric layer 28, were formed respectively on the optical separation layer 13 by the magnetron sputtering method to form the second information layer 14. Then, the cover layer 15 with a thickness of 0.1 mm was formed by the spin coat method. In short, the information recording medium of Example 2 describes the case where an oxide of at least one of the elements contained in the recording layers is contained in the interface layers (Ga in the recording layers and $Ga_2O_3$ in the interface layers). In this example, the content (the value of X) of $Ga_2O_3$ in the interface layers 18, 20, 25, and 27 was changed to 0, 10, 12, 15, 20, 30, 40, 50, 60, 70, 80 and 90 in terms of mol % to prepare 12 kinds of samples (samples 2-1 to 2-12) for studying the composition dependency of the interface layers.

TABLE 4

Material composition
of the first information layer 12

| Reflective layer 16 | Ag alloy |
|---|---|
| Dielectric layer 17 | $ZrO_2$-20 mol % $Cr_2O_3$ |
| Interface layer 18 | $ZrO_2$-X mol % $Ga_2O_3$ (X varies in a range of $0 \leq X \leq 90$) |
| Recording layer 19 | $Ge_{44}Bi_4Te_{51}Ga_1$ |
| Interface layer 20 | $ZrO_2$-X mol % $Ga_2O_3$ (X varies in a range of $0 \leq X \leq 90$) |
| Dielectric layer 21 | ZnS-20 mol % $SiO_2$ |

Material composition
of the second information layer 14

| High refractive index layer 22 | $TiO_2$ |
|---|---|
| Reflective layer 23 | Ag alloy |
| Dielectric layer 24 | $ZrO_2$-20 mol % $Cr_2O_3$ |
| Interface layer 25 | $ZrO_2$-X mol % $Ga_2O_3$ (X varies in a range of $0 \leq X \leq 90$) |
| Recording layer 26 | $Ge_{44}Bi_4Te_{51}Ga_1$ |
| Interface layer 27 | $ZrO_2$-X mol % $Ga_2O_3$ (X varies in a range of $0 \leq X \leq 90$) |
| Dielectric layer 28 | ZnS-20 mol % $SiO_2$ |

Example 3

A structure of a disk-like information recording medium of Example 3 is described in detail with reference to FIG. 1 and Table 5. A polycarbonate substrate with a diameter of 120 mm and a thickness of 1.1 mm having on its surface a concave-convex guide groove with a pitch of 0.3 μm and a depth of 20 nm was used as the substrate 11. A 80-nm-thick Ag alloy film to serve as the reflective layer 16, a $ZrO_2$-20 mol % $Cr_2O_3$ film to serve as the dielectric layer 17, a 5-nm-thick $ZrO_2$-[(100−X)/2] mol % $SiO_2$—X mol % $In_2O_3$ film (X varies in a range of $0 \leq X \leq 90$) to serve as the interface layer 18, a 12-nm-thick $Ge_{44}Bi_4Te_{51}In_1$ film to serve as the recording layer 19, a 5-nm-thick $ZrO_2$-[(100−X)/2] mol % $SiO_2$—X mol % $In_2O_3$ film (X varies in a range of $0 \leq X \leq 90$) to serve as the interface layer 20, and a 65-nm-thick ZnS-20 mol % $SiO_2$ film to serve as the dielectric layer 21 were formed respectively on the substrate by the magnetron sputtering method to form the first information layer 12. Then, an ultraviolet curable resin was applied on the first information layer 12, and a polycarbonate substrate with a radius of 120 mm and a thickness of 0.6 mm having on its surface a concave-convex guide groove with a pitch of 0.3 μm and a depth of 20 nm was allowed to adhere thereto. The ultraviolet curable resin was cured by ultraviolet ray irradiation, and the polycarbonate substrate was stripped off. Then the optical separation layer 13 of 25 μm thickness with a groove transferred to its surface was formed. Subsequently, a 23-nm-thick $TiO_2$ film to serve as the high refractive index layer 22, a 10-nm-thick Ag alloy film to serve as the reflective layer 23, which has the same material composition as that of the reflective layer 16 of the first information layer 12, a 13-nm-thick $ZrO_2$-20 mol % $Cr_2O_3$ film to serve as the dielectric layer 24, a 5-nm-thick $ZrO_2$-[(100−X)/2] mol % $SiO_2$—X mol % $In_2O_3$ (X varies in a range of $0 \leq X \leq 90$) film to serve as the interface layer 25, a 7-nm-thick $Ge_{44}Bi_4Te_{51}In_1$ film to serve as the recording layer 26, a 5-nm-thick $ZrO_2$-[(100−X)/2] mol % $SiO_2$—X mol % $In_2O_3$ (X varies in a range of $0 \leq X \leq 90$) film to serve as the interface layer 27, and a 35-nm-thick ZnS-20 mol % $SiO_2$ film to serve as the dielectric layer 28, were formed respectively on the optical separation layer 13 by the magnetron sputtering method to form the second information layer 14. Then, the cover layer 15 with a thickness of 0.1 mm was formed by the spin coat method. In short, the information recording medium of Example 3 describes the case where an oxide of at least one of the elements contained in the recording layers is contained in the interface layers (In the recording layers and $In_2O_3$ in the interface layers). In this example, the content (the value of X) of $In_2O_3$ in the interface layers 18, 20, 25, and 27 was changed to 0, 10, 12, 15, 20, 30, 40, 50, 60, 70, 80 and 90 in terms of mol % to prepare 12 kinds of samples (samples 3-1 to 3-12) for studying composition dependency of the interface layers.

TABLE 5

Material composition
of the first information layer 12

| Reflective layer 16 | Ag alloy |
|---|---|
| Dielectric layer 17 | $ZrO_2$-20 mol % $Cr_2O_3$ |
| Interface layer 18 | $ZrO_2$-[(100 − X)/2] mol % $SiO_2$-X mol % $In_2O_3$ (X varies in a range of $0 \leq X \leq 90$) |
| Recording layer 19 | $Ge_{44}Bi_4Te_{51}In_1$ |
| Interface layer 20 | $ZrO_2$-[(100 − X)/2] mol % $SiO_2$-X mol % $In_2O_3$ (X varies in a range of $0 \leq X \leq 90$) |
| Dielectric layer 21 | ZnS-20 mol % $SiO_2$ |

Material composition
of the second information layer 14

| High refractive index layer 22 | $TiO_2$ |
|---|---|
| Reflective layer 23 | Ag alloy |
| Dielectric layer 24 | $ZrO_2$-20 mol % $Cr_2O_3$ |
| Interface layer 25 | $ZrO_2$-[(100 − X)/2] mol % $SiO_2$-X mol % $In_2O_3$ (X varies in a range of $0 \leq X \leq 90$) |
| Recording layer 26 | $Ge_{44}Bi_4Te_{51}In_1$ |
| Interface layer 27 | $ZrO_2$-[(100 − X)/2] mol % $SiO_2$-X mol % $In_2O_3$ (X varies in a range of $0 \leq X \leq 90$) |
| Dielectric layer 28 | ZnS-20 mol % $SiO_2$ |

Example 4

A structure of a disk-like information recording medium of Example 4 is described in detail with reference to FIG. 1 and Table 6. A polycarbonate substrate with a diameter of 120 mm and a thickness of 1.1 mm having on its surface a concave-convex guide groove with a pitch of 0.3 μm and a depth of 20 nm was used as the substrate 11. A 80-nm-thick Ag alloy film to serve as the reflective layer 16, a 20-nm-thick $ZrO_2$-20 mol % $Cr_2O_3$ film to serve as the dielectric layer 17, a 5-nm-thick $[46(ZrO_2)$-$4(Y_2O_3)]$-$[(100-X)/2]$ mol % $SiO_2$—X mol % $In_2O_3$ (X varies in a range of $0 \leq X \leq 90$) film to serve as the interface layer 18, a 12-nm-thick $Ge_{44}Bi_4Te_{51}In_1$ film to serve as the recording layer 19, a 5-nm-thick $[46(ZrO_2)$-$4(Y_2O_3)]$-$[(100-X)/2]$ mol % $SiO_2$—X mol % $In_2O_3$ (X varies in a range of $0 \leq X \leq 90$) film to serve as the interface layer 20, and a 65-nm-thick ZnS-20 mol % $SiO_2$ film to serve as the dielectric layer 21, were formed respectively on the substrate by a magnetron sputtering method to form the first information layer 12. Then, an ultraviolet curable resin was applied on the first information layer 12, and a polycarbonate substrate with a radius of 120 mm and a thickness of 0.6 mm having on its surface a concave-convex guide groove with a pitch of 0.3 μm and a depth of 20 nm was allowed to adhere thereto. The ultraviolet curable resin was cured by ultraviolet ray irradiation, and the polycarbonate substrate was stripped off. Thus the optical separation layer 13 of 25 μm thickness with a groove transferred to its surface was formed. Subsequently, a 23-nm-thick $TiO_2$ film to serve as the high refractive index layer 22 of the second information layer 14, a 10-nm-thick Ag alloy film to serve as the reflective layer 23, which has the same material composition as that of the reflective layer 16 of the first information layer 12, a 13-nm-thick $ZrO_2$-20 mol % $Cr_2O_3$ film to serve as the dielectric layer 24, a 5-nm-thick $[46(ZrO_2)$-$4(Y_2O_3)]$-$[(100-X)/2]$ mol % $SiO_2$—X mol % $In_2O_3$ (X varies in a range of $0 \leq X \leq 90$) film to serve as the interface layer 25, a 7-nm-thick $Ge_{44}Bi_4Te_{51}In_1$ film to serve as the recording layer 26, a 5-nm-thick $[46(ZrO_2)$-$4(Y_2O_3)]$-$[(100-X)/2]$ mol % $SiO_2$—X mol % $In_2O_3$ (X varies in a range of $0 \leq X \leq 90$) film to serve as the interface layer 27, and a 35-nm-thick ZnS-20 mol % $SiO_2$ film to serve as the dielectric layer 28, were formed respectively on the optical separation layer 13 by the magnetron sputtering method to form the second information layer 14. Subsequently, the cover layer 15 with a thickness of 0.1 mm was formed by the spin coat method. In short, the information recording medium of Example 4 describes the case where an oxide of at least one of the elements contained in the recording layers is contained in the interface layers (In the recording layers and $In_2O_3$ in the interface layers). In this example, the content (the value of X) of $In_2O_3$ in the interface layers 18, 20, 25, and 27 was changed to 0, 10, 12, 15, 20, 30, 40, 50, 60, 70, 80 and 90 in terms of mol % to prepare 12 kinds of samples (samples 4-1 to 4-12) for studying composition dependency of the interface layers.

TABLE 6

Material composition of the first information layer 12

| | |
|---|---|
| Reflective layer 16 | Ag alloy |
| Dielectric layer 17 | $ZrO_2$-20 mol % $Cr_2O_3$ |
| Interface layer 18 | $[46(ZrO_2)$-$4(Y_2O_3)]$-$[(100 - X)/2]$ mol % $SiO_2$-X mol % $In_2O_3$ (X varies in a range of $0 \leq X \leq 90$) |
| Recording layer 19 | $Ge_{44}Bi_4Te_{51}In_1$ |
| Interface layer 20 | $[46(ZrO_2)$-$4(Y_2O_3)]$-$[(100 - X)/2]$ mol % $SiO_2$-X mol % $In_2O_3$ (X varies in a range of $0 \leq X \leq 90$) |
| Dielectric layer 21 | ZnS-20 mol % $SiO_2$ |

Material composition of the second information layer 14

| | |
|---|---|
| High refractive index layer 22 | $TiO_2$ |
| Reflective layer 23 | Ag alloy |
| Dielectric layer 24 | $ZrO_2$-20 mol % $Cr_2O_3$ |
| Interface layer 25 | $[46(ZrO_2)$-$4(Y_2O_3)]$-$[(100 - X)/2]$ mol % $SiO_2$-X mol % $In_2O_3$ (X varies in a range of $0 \leq X \leq 90$) |
| Recording layer 26 | $Ge_{44}Bi_4Te_{51}In_1$ |
| Interface layer 27 | $[46(ZrO_2)$-$4(Y_2O_3)]$-$[(100 - X)/2]$ mol % $SiO_2$-X mol % $In_2O_3$ (X varies in a range of $0 \leq X \leq 90$) |
| Dielectric layer 28 | ZnS-20 mol % $SiO_2$ |

The discs of Example 1, Comparative Examples 1 and 2 were observed for film corrosion (separation) using an optical microscope after it had been left in an environment at 90° C. and a relative humidity of 80%. An evaluation was made by counting the number of corroded points per field of view of the optical microscope after the discs had been left in an environment at 90° C. and a relative humidity of 80% for 100 hours. It is desirable that the number of corroded points is smaller, with zero as a target, in order to meet the requirement that the discs should, as a commercial product, have a lifetime of 30 years at room temperature. The observation for the film corrosion was carried out after 50 hours and 200 hours as well. Differences in durability also were compared. Needless to say, the less the corrosion occurs, the more reliable the disc is in a longer period of time of testing. The present inventors also aimed at it accordingly. In light of this, not only the number of corroded points observed after 100 hours but also that observed after 200 hours was taken into consideration. For example, even if corrosion was observed after 100 hours, it can be judged that the effect of suppressing film separation has been obtained when the number of corroded points was The results of the film corrosion test on the discs of Example 1, Comparative Examples 1 and 2 are shown in Table 7 (results of the first information layer) and Table 8 (results of the second information layer).

TABLE 7

| First information layer | Comparative Example 1 | Comparative Example 2 | Example 1 |
|---|---|---|---|
| Number of corroded points after 50 hours in a corrosion test (at 90° C., 80% of relative humidity) | 0 | 0 | 0 |
| Number of corroded points | 10 | 5 | 0 |

TABLE 7-continued

| First information layer | Comparative Example 1 | Comparative Example 2 | Example 1 |
|---|---|---|---|
| after 100 hours in a corrosion test (at 90° C., 80% of relative humidity) | | | |
| Number of corroded points after 200 hours in a corrosion test (at 90° C., 80% of relative humidity) | >50 | 30 | 0 |

TABLE 8

| First information layer | Comparative Example 1 | Comparative Example 2 | Example 1 |
|---|---|---|---|
| Number of corroded points after 50 hours in a corrosion test (at 90° C., 80% of relative humidity) | 5 | 1 | 0 |
| Number of corroded points after 100 hours in a corrosion test (at 90° C., 80% of relative humidity) | 30 | 5 | 0 |
| Number of corroded points after 200 hours in a corrosion test (at 90° C., 80% of relative humidity) | >50 | 20 | 0 |

When a Ge—Bi—Te—M material (Ga was selected as M in this comparative example) represented by $Ge_\alpha Bi_\beta Te_\gamma M_{100-\alpha-\beta-\gamma}$ (atom %) was used while oxide layers containing an oxide of the element M were not used as the interface layers as described in Comparative Example 1, corrosion (separation) was observed after 100 hours on the first information layer and after 50 hours on the second information layer in the film corrosion test as shown in Table 7 and Table 8. When a Ge—Bi—Te—M material (Al was selected as M in this comparative example) represented by $Ge_\alpha Bi_\beta Te_\gamma M_{100-\alpha-\beta-\gamma}$ (atom %) was used, and oxide layers containing an oxide of the element M (Ga is selected as M in this comparative example) that is not contained in the recording layers were used as the interface layers as described in Comparative Example 2, corrosion (separation) occurred after 100 hours on the first information layer and after 50 hours on the second information layer because the element M contained in the recording layers and the element M contained in the interface layers are different from each other. A sharp increase was observed in the number of corroded points after 200 hours with respect to the number of corroded points after 100 hours.

On the other hand, when a Ge—Bi—Te—M material (Ga was selected as M in this comparative example) represented by $Ge_\alpha Bi_\beta Te_\gamma M_{100-\alpha-\beta-\gamma}$ (atom %) was used while oxide layers containing an oxide of the element M (Ga is selected as M in this example) were used as the interface layers as described in Example 1, that is, when an oxide of the same element as the element M contained in the recording layers is contained in the interface layers, a highly reliable information recording medium was obtained that did not have corrosion (separation) until after 200 hours in the film corrosion test.

Here, when the element M contained in the recording layers and the oxide of the element M contained in the interface layers are the same elements, it is effective for improving corrosion resistance. The reason for this is not clearly understood, but the present inventors think as follows. Since the recording layer contained the same element as that contained in the interface layer, these elements were slightly mixed between the recording layer and the interface layer, connecting the recording layer and the interface layer at the element level, and thereby adhesiveness between the recording layer and the interface layer was improved. In addition, since the element M contained in the interface layer is the same as the element M contained in the recording layer, even when the element M contained in the interface layer moves into the recording layer at the time of use, rapid characteristic degradation hardly occurs with the recording layer because the element M is an element already contained in the recording layer. In short, the information recording medium of the present invention conceivably allows the characteristic degradation to be suppressed even after long-term use.

Next, the results of studies about the relationship between reliability and the content of the oxide of the element M in the interface layers of Example 2 are shown in Table 9 (results of the first information layer) and Table 10 (results of the second information layer).

TABLE 9

(First information layer)

| | Content of the oxide of element M (mol %) | | | | | | | | | | | |
|---|---|---|---|---|---|---|---|---|---|---|---|---|
| | 0 | 10 | 12 | 15 | 20 | 30 | 40 | 50 | 60 | 70 | 80 | 90 |
| Number of corroded points after 50 hours in a corrosion test (at 90° C., 80% of relative humidity) | 0 | 0 | 0 | 0 | 0 | 0 | 0 | 0 | 0 | 0 | 0 | 0 |
| Number of corroded points after 100 hours in a corrosion test (at 90° C., 80% of relative humidity) | 20 | 10 | 5 | 2 | 0 | 0 | 0 | 0 | 0 | 0 | 0 | 1 |
| Number of corroded points after 200 hours in a corrosion test (at 90° C., 80% of relative humidity) | >50 | 20 | 10 | 5 | 5 | 0 | 0 | 0 | 0 | 0 | 3 | 5 |

TABLE 10

(Second information layer)

| | Content of the oxide of element M (mol %) | | | | | | | | | | | |
|---|---|---|---|---|---|---|---|---|---|---|---|---|
| | 0 | 10 | 12 | 15 | 20 | 30 | 40 | 50 | 60 | 70 | 80 | 90 |
| Number of corroded points after 50 hours in a corrosion test (at 90° C., 80% of relative humidity) | 20 | 5 | 0 | 0 | 0 | 0 | 0 | 0 | 0 | 0 | 0 | 0 |
| Number of corroded points after 100 hours in a corrosion test (at 90° C., 80% of relative humidity) | >50 | 25 | 5 | 0 | 0 | 0 | 0 | 0 | 0 | 0 | 0 | 10 |
| Number of corroded points after 200 hours in a corrosion test (at 90° C., 80% of relative humidity) | >50 | >50 | >50 | >50 | >50 | 20 | 0 | 0 | 0 | 5 | 10 | 20 |

The results of studies about the relationship between reliability and the content of the oxide of the element M in the interface layers of Example 3 are shown in Table 11 (results of the first information layer) and Table 12 (results of the second information layer).

TABLE 11

(First information layer)

| | Content of the oxide of element M (mol %) | | | | | | | | | | | |
|---|---|---|---|---|---|---|---|---|---|---|---|---|
| | 0 | 10 | 12 | 15 | 20 | 30 | 40 | 50 | 60 | 70 | 80 | 90 |
| Number of corroded points after 50 hours in a corrosion test (at 90° C., 80% of relative humidity) | 0 | 0 | 0 | 0 | 0 | 0 | 0 | 0 | 0 | 0 | 0 | 0 |
| Number of corroded points after 100 hours in a corrosion test (at 90° C., 80% of relative humidity) | 20 | 10 | 5 | 2 | 0 | 0 | 0 | 0 | 0 | 0 | 0 | 3 |
| Number of corroded points after 200 hours in a corrosion test (at 90° C., 80% of relative humidity) | >50 | 20 | 10 | 5 | 7 | 0 | 0 | 0 | 0 | 0 | 5 | 10 |

TABLE 12

(Second information layer)

| | Content of the oxide of element M (mol %) | | | | | | | | | | | |
|---|---|---|---|---|---|---|---|---|---|---|---|---|
| | 0 | 10 | 12 | 15 | 20 | 30 | 40 | 50 | 60 | 70 | 80 | 90 |
| Number of corroded points after 50 hours in a corrosion test (at | 20 | 5 | 0 | 0 | 0 | 0 | 0 | 0 | 0 | 0 | 0 | 0 |

TABLE 12-continued (Second information layer)

| | Content of the oxide of element M (mol %) | | | | | | | | | | |
|---|---|---|---|---|---|---|---|---|---|---|---|
| | 0 | 10 | 12 | 15 | 20 | 30 | 40 | 50 | 60 | 70 | 80 | 90 |
| Number of corroded points after 100 hours in a corrosion test (at 90° C., 80% of relative humidity) | >50 | 25 | 5 | 0 | 0 | 0 | 0 | 0 | 0 | 0 | 0 | 10 |
| Number of corroded points after 200 hours in a corrosion test (at 90° C., 80% of relative humidity) | >50 | >50 | >50 | >50 | >50 | 25 | 0 | 0 | 0 | 7 | 15 | 20 |

The results of studies about the relationship between reliability and the content of the oxide of the element M in the interface layers of Example 4 are shown in Table 13 (results of the first information layer) and Table 14 (results of the second information layer).

TABLE 13

(First information layer)

| | Content of the oxide of element M (mol %) | | | | | | | | | | |
|---|---|---|---|---|---|---|---|---|---|---|---|
| | 0 | 10 | 12 | 15 | 20 | 30 | 40 | 50 | 60 | 70 | 80 | 90 |
| Number of corroded points after 50 hours in a corrosion test (at 90° C., 80% of relative humidity) | 0 | 0 | 0 | 0 | 0 | 0 | 0 | 0 | 0 | 0 | 0 | 0 |
| Number of corroded points after 100 hours in a corrosion test (at 90° C., 80% of relative humidity) | 20 | 15 | 5 | 3 | 0 | 0 | 0 | 0 | 0 | 0 | 0 | 3 |
| Number of corroded points after 200 hours in a corrosion test (at 90° C., 80% of relative humidity) | >50 | 20 | 15 | 7 | 10 | 0 | 0 | 0 | 0 | 0 | 5 | 10 |

TABLE 14

(Second information layer)

| | Content of the oxide of element M (mol %) | | | | | | | | | | |
|---|---|---|---|---|---|---|---|---|---|---|---|
| | 0 | 10 | 12 | 15 | 20 | 30 | 40 | 50 | 60 | 70 | 80 | 90 |
| Number of corroded points after 50 hours in a corrosion test (at 90° C., 80% of relative humidity) | 20 | 10 | 0 | 0 | 0 | 0 | 0 | 0 | 0 | 0 | 0 | 0 |
| Number of corroded points after 100 hours in a corrosion | >50 | 30 | 10 | 5 | 0 | 0 | 0 | 0 | 0 | 0 | 0 | 15 |

TABLE 14-continued (Second information layer)

| | Content of the oxide of element M (mol %) | | | | | | | | | | | |
|---|---|---|---|---|---|---|---|---|---|---|---|---|
| | 0 | 10 | 12 | 15 | 20 | 30 | 40 | 50 | 60 | 70 | 80 | 90 |
| test (at 90° C., 80% of relative humidity) Number of corroded points after 200 hours in a corrosion test (at 90° C., 80% of relative humidity) | >50 | >50 | >50 | >50 | >50 | 25 | 0 | 0 | 0 | 7 | 10 | 20 |

As shown in Table 9, in the first information layer of Example 2, it was proved that when the oxide ($Ga_2O_3$) of the element M was contained in the interface layers, the number of corroded points was reduced, and the number of corroded points did not sharply increase even after long hours, and further, the number of corroded points was able to be reduced more reliably when $Ga_2O_3$ exceeding 10 mol % was contained. Furthermore, it was proved that when the interface layers had a composition of $ZrO_2$—X mol % $Ga_2O_3$ ($20 \leq X \leq 80$ mol %), corrosion (separation) was not observed after 100 hours in the film corrosion test (at 90° C., 80% of relative humidity). When the interface layers had a composition of $ZrO_2$—X mol % $Ga_2O_3$ ($20 \leq X \leq 70$ mol %), it was proved that corrosion (separation) was not observed even after 200 hours in the film corrosion test (at 90° C., 80% of relative humidity).

As shown in Table 10, in the second information layer of Example 2, when the interface layers had a composition of $ZrO_2$—X mol % $Ga_2O_3$ ($20 \leq X \leq 80$), corrosion (separation) was not observed after 100 hours in the film corrosion test (at 90° C., 80% of relative humidity). When the interface layers had a composition of $ZrO_2$—X mol % $Ga_2O_3$ ($40 \leq X \leq 60$), corrosion (separation) was not observed after 200 hours in a film corrosion test (at 90° C., 80% of relative humidity).

As shown in Table 11, in the first information layer of Example 3, it was proved that the number of corroded points was reduced when the oxide ($In_2O_3$) of the element M was contained in the interface layers, and the number of corroded points did not sharply increase even after long hours, and further, the number of corroded points was able to be reduced more reliably when $In_2O_3$ exceeding 10 mol % was contained. Furthermore, when the interface layers had a composition of $ZrO_2$-[(100−X)/2] mol % $SiO_2$—X mol % $In_2O_3$ ($20 \leq X \leq 80$ mol %), corrosion (separation) was not observed even after 100 hours in the film corrosion test (at 90° C., 80% of relative humidity). When the interface layers had a composition of $ZrO_2$-[(100−X)/2] mol % $SiO_2$—X mol % $In_2O_3$ ($30 \leq X \leq 70$ mol %), corrosion (separation) was not observed even after 200 hours in the film corrosion test (at 90° C., 80% of relative humidity).

As shown in Table 12, in the second information layer of Example 3, when the interface layers had a composition of $ZrO_2$-[(100−X)/2] mol % $SiO_2$—X mol % $In_2O_3$ ($20 \leq X \leq 80$), corrosion (separation) was not observed after 100 hours in the film corrosion test (at 90° C., 80% of relative humidity). When the interface layers had a composition of $ZrO_2$-[(100−X)/2] mol % $SiO_2$—X mol % $In_2O_3$ ($40 \leq X \leq 60$), corrosion (separation) was not observed after 200 hours in the film corrosion test (at 90° C., 80% of relative humidity).

As shown in Table 13, in the first information layer of Example 4, it was proved that the number of corroded points was reduced when the oxide ($In_2O_3$) of the element M was contained in the interface layers, and the number of corroded points did not sharply increase even after long hours, and further, the number of corroded points was able to be reduced in a reliable manner when $In_2O_3$ exceeding 10 mol % was contained. Furthermore, when the interface layers had a composition of $[46(ZrO_2)-4(Y_2O_3)]$-[(100−X)/2] mol % $SiO_2$—X mol % $In_2O_3$ ($20 \leq X \leq 80$ mol %), corrosion (separation) was not observed even after 100 hours in the film corrosion test (at 90° C., 80% of relative humidity). When the interface layers had a composition of $[46(ZrO_2)-4(Y_2O_3)]$-[(100−X)/2] mol % $SiO_2$—X mol % $In_2O_3$ ($30 \leq X \leq 70$ mol %), corrosion (separation) was not observed even after 200 hours in the film corrosion test (at 90° C., 80% of relative humidity).

As shown in Table 14, in the second information layer of Example 4, when the interface layers had a composition of $[46(ZrO_2)-4(Y_2O_3)]$-[(100−X)/2] mol % $SiO_2$—X mol % $In_2O_3$ ($20 \leq X \leq 80$), corrosion (separation) was not observed after 100 hours in the film corrosion test (at 90° C., 80% of relative humidity). When the interface layers had a composition of $[46(ZrO_2)-4(Y_2O_3)]$-[(100−X)/2] mol % $SiO_2$—X mol % $In_2O_3$ ($40 \leq X \leq 60$), corrosion (separation) was not observed after 200 hours in the film corrosion test (at 90° C., 80% of relative humidity).

It was proved from the results of Examples 2 to 4 as described above that the number of corroded points was able to be reduced when the interface layers contained an oxide of element M contained in the recording layer, particularly, the increase in the number of the corroded points after long hours was able to be suppressed effectively. Also, when the interface layers contained 10 mol % or more of the oxide of the element M, the number of the corroded points was able to be reduced more effectively. When the interface layers had a composition of $ZrO_2$—X mol % $Ga_2O_3$, $ZrO_2$-[(100−X)/2] mol % $SiO_2$—X mol % $In_2O_3$ or $[46(ZrO_2)-4(Y_2O_3)]$-[(100−X)/2] mol % $SiO_2$—X mol % $In_2O_3$, where X is in a range of $20 \leq X \leq 80$ respectively, both the first information layers and the second information layers were allowed to obtain a high reliability. The reliability further was increased with the first information layers when X was in a range of $30 \leq X \leq 70$. With the second information layers, the reliability further was increased when X was in a range of $40 \leq X \leq 60$. Here, as a result, when X was in a range of 30≦X≦70, the second information layers did not show further reliability improvement as much as the first information layers did. However, considering the lifetime requirement for commercial products, 30 years of lifetime at room temperature can still be guaranteed even with this range, so this result should be good enough. The differences of the film corrosion test results between the first information layer and the second information layer may be due to the fact that each of the layers forming the second information layer is thinner than the counterparts of the first information layer, which probably reduces an effect of preventing water from intruding into between the recording layer and the interface layer in the humidity resistance test. This result reveals that there is an optimum value also for the amount of the oxide of the element M to be mixed in the interface layers, that is, 20≦X≦80 mol %, and further preferably 30≦X≦70 mol %.

Examples 1, 2, 3, and 4 describe the cases where the element M in the recording layer and the oxide of the element M in the interface layer were Ga and Ga oxide, and In and In oxide respectively. Similar results also were obtained when the element M was Al or Mn as described in claim 1.

Examples 1 and 2 describe the cases where the oxide of the element M was mixed with Zr oxide as an oxide forming the interface layers. Example 3 describes the case where Zr oxide and $SiO_2$ oxide were mixed as oxides forming the interface layers. Example 4 further describes the case where Y oxide was mixed. However, the oxides to be used for the interface layers are not limited to these. Similar results also were obtained when at least one oxide selected from Zr oxide, Si oxide, Cr oxide, Hf oxide, and Y oxide was mixed with the oxide of the element M.

Examples 1, 2, 3, and 4 describe the cases where the oxide of the element M was mixed in all the interface layers 18, 20, 25, and 27 of FIG. 1. And good results similarly were obtained in the film corrosion test when the oxide of the element M was mixed only in either the interface layer 18 or the interface layer 20, and when the oxide of the element M was mixed only in either the interface layer 25 or the interface layer 27. Also, when each of the interface layers 18, 20, 25, and 27 had a different composition, good results similarly were obtained in the film corrosion test. For example, good results were obtained in the cases where the interface layer 18, the recording layer 19 and the interface layer 20 had a composition of $(ZrO_2)_{25}(SiO_2)_{25}(In_2O_3)_{50}$, Ge—Bi—Te—In, and $(ZrO_2)_{50}(In_2O_3)_{50}$ in this order respectively, and where the interface layer 25, the recording layer 26 and the interface layer 27 had a composition of $(ZrO_2)_{40}(SiO_2)_{10}(In_2O_3)_{50}$, Ge—Bi—Te—In, and $(ZrO_2)_{60}(SiO_2)_{10}(In_2O_3)_{30}$ in this order respectively.

In the information recording medium of the present invention, when the recording layers had a composition range (a Ge—Bi—Te—M material represented by $Ge_\alpha Bi_\beta Te_\gamma M_{100-\alpha-\beta-\gamma}$ (atom %)), good signal properties were obtained in high speed recording prior to a life test, and good results similarly were obtained in the film corrosion tests in Examples 1, 2, 3, and 4.

Examples 1, 2, 3, and 4 describe the cases where the dielectric layers 21 and 28 were composed of ZnS—$SiO_2$. Similar results also were obtained when the dielectric layers 21 and 28 were composed of a material containing at least one selected from $Al_2O_3$, $SiO_2$, $Ta_2O_5$, Mo—O, $WO_3$, $ZrO_2$, $HfO_2$, Al—N, B—N, Ge—N, Si—N, Ti—N, Zr—N, $DyF_3$, $ErF_3$, $EuF_3$, $CeF_3$, $BiF_3$, $LaF_3$, and ZnS, specifically, such as $Ta_2O_5$-50 mol % $SiO_2$, $HfO_2$-30 mol % $SiO_2$-40 mol % $Cr_2O_3$, AlN-50 mol % $SnO_2$, $ZrO_2$-20 mol % $SiO_2$-30 mol % $Cr_2O_3$-20 mol % $LaF_3$, and $CeF_3$-80 mol % $In_2O_3$, which are not used in the examples.

Examples 1, 2, 3, and 4 describe the cases where the reflective layer 16 and the reflective layer 23 were formed of an Ag alloy. Similar results also were obtained when the reflective layers 16 and the 23 contained, as their main component (at least 90 atom %), a material containing at least one selected from Ag, Al, and Au, specifically, such as Al—Cr, Ag—Ga—Cu, and Ag—Pd—Cu, which are not used in the examples.

Examples 1, 2, 3, and 4 describe the cases where the high refractive index layer 22 was formed of an oxide of Ti. Similar results also were obtained when the high refractive index layer 22 contained, as its main component, a material containing at least one oxide selected from $TiO_2$ and $Nb_2O_5$, specifically, such as $TiO_2$-10 mol % $SiO_2$ and $TiO_2$-50 mol % $Nb_2O_5$, which are not used in the examples. Similar results also were obtained even when the high refractive index layer was not provided depending on the disk configuration.

Examples 1, 2, 3, and 4 describe an information recording medium in which two information layers were stacked with an optical separation layer interposed therebetween. Similar results also were obtained in the case where only one information layer was provided (in the case where only the substrate 1, the first information layer 2, and the cover layer 9 were provided, or in the case where only the substrate 1, the second information layer 4, and the cover layer 9 were provided in FIG. 2).

INDUSTRIAL APPLICABILITY

An information recording medium of the present invention, a method and an apparatus for manufacturing the same can provide a highly reliable information recording medium that has excellent moisture resistance. Therefore, these are useful for high speed recording with a medium such as Blu-ray Disc from the viewpoint of improving the reliability thereof.

The invention claimed is:

1. An information recording medium, comprising:
a recording layer whose phase can change by an optical or an electrical system so as to be detectable, and
an oxide layer that is in contact with the recording layer, wherein:
the recording layer contains a Ge—Bi—Te-M material represented by the following formula:

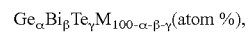

$Ge_\alpha Bi_\beta Te_\gamma M_{100-\alpha-\beta-\gamma}$ (atom %), where M denotes at least one element selected from Al, Ga, In and Mn, and α, β and γ satisfy 25≦α≦60, 0<β≦18, 35≦γ≦55, and 82≦α+β+γ<100, and the oxide layer contains at least one oxide of the element M contained in the recording layer.

2. The information recording medium according to claim 1, wherein the content of the oxide of the element M in the oxide layer exceeds 10 mol %.

3. The information recording medium according to claim 2, wherein the content of the oxide of the element M in the oxide layer is 20 mol % or higher and 80 mol % or lower.

4. The information recording medium according to claim 3, wherein the content of the oxide of the element M in the oxide layer is 30 mol % or higher and 70 mol % or lower.

5. The information recording medium according to claim 1, wherein the oxide layer further contains at least one selected from Zr oxide, Si oxide, Cr oxide, Hf oxide, and Y oxide.

6. The information recording medium according to claim 1, comprising a plurality of information layers, wherein at least one of the plurality of information layers includes the recording layer and the oxide layer.

7. The information recording medium according to claim 1, wherein:
at least a dielectric layer, the recording layer, and a reflective layer are provided in this order from the laser beam incident side, and
the oxide layer is provided between the dielectric layer and the recording layer or between the recording layer and the reflective layer, or both between the dielectric layer and the recording layer and between the recording layer and the reflective layer.

8. A method for manufacturing an information recording medium including a recording layer whose phase can change by an optical or an electrical system so as to be detectable, and an oxide layer that is in contact with the recording layer, the method comprising:

(i) forming the recording layer containing a Ge—Bi—Te-M material represented by the following formula:

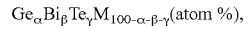

$Ge_\alpha Bi_\beta Te_\gamma M_{100-\alpha-\beta-\gamma}$(atom %), where $\alpha$, $\beta$ and $\gamma$ satisfy $25 \leq \alpha \leq 60$, $0 < \beta \leq 18$, $35 \leq \gamma \leq 55$, and $82 \leq \alpha+\beta+\gamma < 100$, by a sputtering method using a first sputtering target containing Ge, Bi, Te, and element M, where M denotes at least one element selected from Al, Ga, In, and Mn, and (ii) forming the oxide layer containing at least one oxide of the element M contained in the recording layer by a sputtering method using a second sputtering target containing at least either one selected from the element M and an oxide of the element M.

9. An apparatus for manufacturing an information recording medium to be used for the manufacturing method described in claim 8, the apparatus being provided with a sputtering device that includes an electrode, the first sputtering target or the second puttering target, and a substrate holder placed facing the first sputtering target or the second sputtering target.

* * * * *

UNITED STATES PATENT AND TRADEMARK OFFICE
CERTIFICATE OF CORRECTION

PATENT NO. : 7,993,720 B2  
APPLICATION NO. : 12/162422  
DATED : August 9, 2011  
INVENTOR(S) : Sakaue et al.

Page 1 of 1

It is certified that error appears in the above-identified patent and that said Letters Patent is hereby corrected as shown below:

Column 28, line 19 (claim 9): "puttering" should read -- sputtering --.

Signed and Sealed this
Twenty-eighth Day of February, 2012

David J. Kappos
*Director of the United States Patent and Trademark Office*